(12) United States Patent
Thorup

(10) Patent No.: US 8,306,958 B2
(45) Date of Patent: Nov. 6, 2012

(54) TIME-OUTS WITH TIME-REVERSED LINEAR PROBING

(75) Inventor: Mikkel Thorup, Florence, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 560 days.

(21) Appl. No.: 12/559,130

(22) Filed: Sep. 14, 2009

(65) Prior Publication Data

US 2011/0066603 A1 Mar. 17, 2011

(51) Int. Cl.
*G06F 17/30* (2006.01)

(52) U.S. Cl. ........ 707/696; 707/802; 707/813; 709/203; 709/223

(58) Field of Classification Search ................ 707/696, 707/802, 813; 711/133; 713/171, 201; 709/203, 709/223; 370/252
See application file for complete search history.

(56) References Cited

U.S. PATENT DOCUMENTS

| | | | | |
|---|---|---|---|---|
| 5,404,488 A * | 4/1995 | Kerrigan et al. | ............. | 711/133 |
| 5,893,120 A * | 4/1999 | Nemes | ........................ | 707/813 |
| 6,067,547 A * | 5/2000 | Douceur | ........................ | 707/802 |
| 7,221,764 B2 * | 5/2007 | Cohen et al. | .................. | 380/278 |
| 7,434,109 B1 * | 10/2008 | Stabile et al. | ................ | 714/47.2 |
| 7,453,376 B2 * | 11/2008 | de Brebisson | .................. | 341/24 |
| 7,779,032 B1 * | 8/2010 | Garfinkel | ...................... | 707/776 |
| 8,015,456 B2 * | 9/2011 | Stabile et al. | .................. | 714/57 |
| 2003/0097564 A1 * | 5/2003 | Tewari et al. | ................. | 713/171 |
| 2004/0015478 A1 * | 1/2004 | Pauly | ............................ | 707/696 |
| 2005/0216773 A1 * | 9/2005 | Mitchell et al. | ............... | 713/201 |
| 2010/0070448 A1 * | 3/2010 | Omoigui | ........................ | 706/47 |
| 2011/0066948 A1 * | 3/2011 | Tsao | ............................ | 715/739 |

OTHER PUBLICATIONS

Blelloch, Guy et al., "Strongly History-Independent Hashing with Applications", Computer Science Department, Carnegie Mellon University, 2007, pp. 1-12.*

* cited by examiner

*Primary Examiner* — Shahid Alam
(74) *Attorney, Agent, or Firm* — Hope Baldauff Hartman, LLC

(57) ABSTRACT

A current key is received at a current arrival time at a computer. An index in an array corresponding to the current key is determined using a hash function. A previous key and a previous arrival time are retrieved from the array at the index. The array is transformed by replacing the previous key and the previous arrival time with the current key and the current arrival time in the array at the index. The previous key and the previous arrival time are inserted into a nearest eligible sequential index in the array.

17 Claims, 9 Drawing Sheets

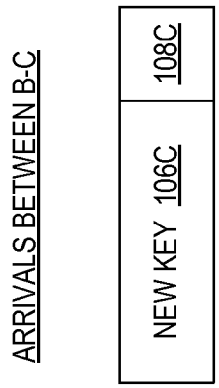
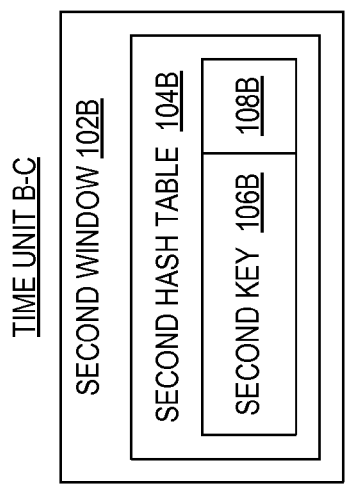
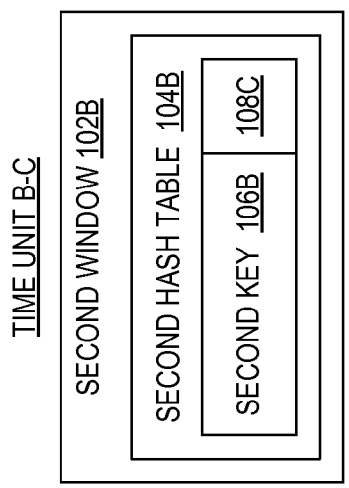
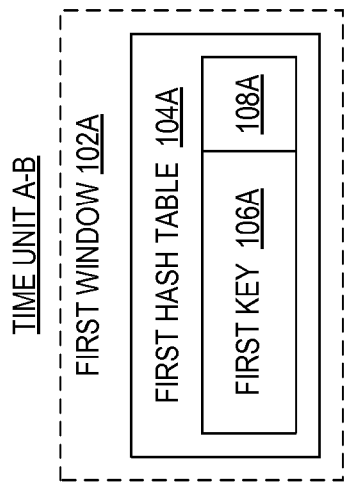
Fig. 1A (Prior Art)
Fig. 1B (Prior Art)

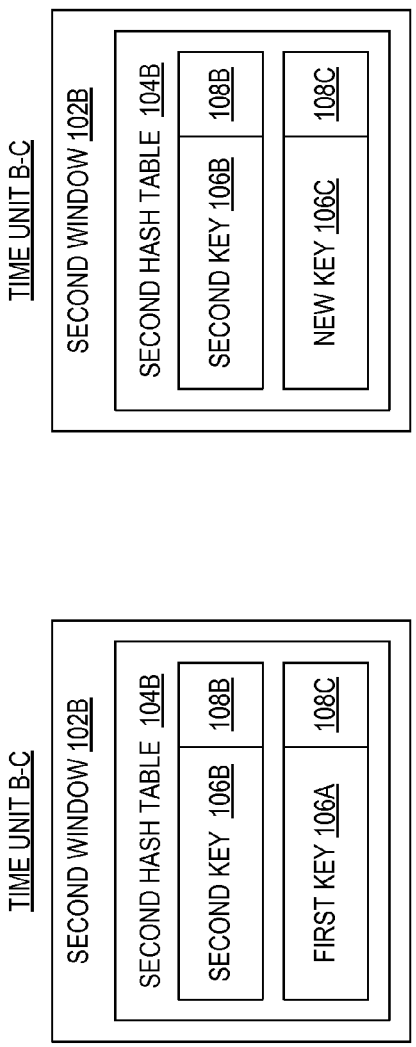
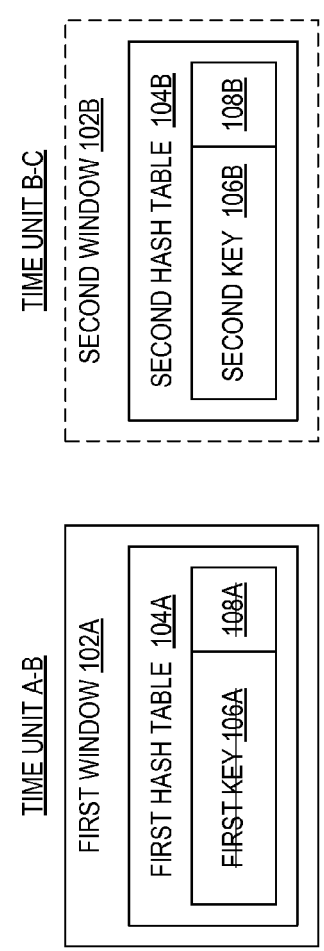
Fig. 1C (Prior Art)
Fig. 1D (Prior Art)
Fig. 1E (Prior Art)

| 10 204A | THOMAS 206A | 0100 208A | ↙ 205A |
|---|---|---|---|
| 11 204B | | 206B | ↙ 205B |
| 12 204C | | 206C | ↙ 205C |

202

THOMAS ARRIVES AT 0100
H(THOMAS) = 10

*Fig. 2A*

| 10 204A | THOMAS 206A | 0100 208A | ↙ 205A |
|---|---|---|---|
| 11 204B | JACOB 206B | 0200 208B | ↙ 205B |
| 12 204C | | 206C | ↙ 205C |

202

JACOB ARRIVES AT 0200
H(JACOB) = 11

*Fig. 2B*

| | | |
|---|---|---|
| 10 204A | THOMAS 206A | 0100 208A | ← 205A
| 11 204B | JACOB 206B | 0200 208B | ← 205B
| 12 204C | PETER 206C | 0300 208C | ← 205C

↑ 202

PETER ARRIVES AT 0300
H(PETER) = 10

*Fig. 2C*

| | | |
|---|---|---|
| 10 204A | PETER 206A | 0400 208A | ← 205A
| 11 204B | JACOB 206B | 0200 208B | ← 205B
| 12 204C | PETER 206C | 0300 208C | ← 205C

↑ 202

PETER ARRIVES AT 0400
H(PETER) = 10

*Fig. 2D*

|  | THOMAS | 0100 |
|---|---|---|
| 10 _304A_ |  | _308A_ 305A ↙ |
| 11 _304B_ |  | _306B_ _308B_ 305B ↙ |
| 12 _304C_ |  | _306C_ _308C_ 305C ↙ |

_302_

THOMAS ARRIVES AT 0100
H(THOMAS) = 10

*Fig. 3A*

|  | THOMAS | 0100 |
|---|---|---|
| 10 _304A_ |  | _306A_ _308A_ 305A ↙ |
| 11 _304B_ | JACOB | 0200 _308B_ 305B ↙ |
| 12 _304C_ |  | _306C_ _308C_ 305C ↙ |

_302_

JACOB ARRIVES AT 0200
H(JACOB) = 11

| | | |
|---|---|---|
| 10 _304A_ | PETER _306A_ | 0300 _308A_ | ← 305A
| 11 _304B_ | JACOB _306B_ | 0200 _308B_ | ← 305B
| 12 _304C_ | THOMAS _306C_ | 0100 _308C_ | ← 305C

302

PETER ARRIVES AT 0300
H(PETER) = 10

Fig. 3D

| | | |
|---|---|---|
| 10 _304A_ | PETER _306A_ | 0400 _308A_ | ← 305A
| 11 _304B_ | JACOB _306B_ | 0200 _308B_ | ← 305B
| 12 _304C_ | ~~THOMAS~~ _306C_ | ~~0400~~ _308C_ | ← 305C

302

PETER ARRIVES AT 0400
H(PETER) = 10

```
typedef struct {TIME time; KEY id;} entry;
entry * A; /* The hash array */

TIME CheckIn(KEY x, TIME current_time) {
/*
   Returns the time for x if live in A; otherwise 0.
   After the call current_time is the time for x in A
*/
    int i;                                  ←—402
    entry a,b;                              ←—404
    TIME death=current_time-lifetime;       ←—406 i=h(x);                                 ←—408
    a=A[i];                                 ←—410
    A[i].id=x;                              ←—412
    A[i].time=current_time;                 ←—414
    if (a.time < death) return 0;           ←—416
    if (a.id == x) return a.time;           ←—418
    i++;                                    ←—420
    for (;;) {                              ←—422
        if (a.time > A[i].time)             ←—424
            b=A[i];                         ←—426
            A[i]=a;                         ←—428
            if (b.time < death) return 0;   ←—430
            if (b.id == x) return b.time;   ←—432
        }
        i++;                                ←—434
    }
}
```

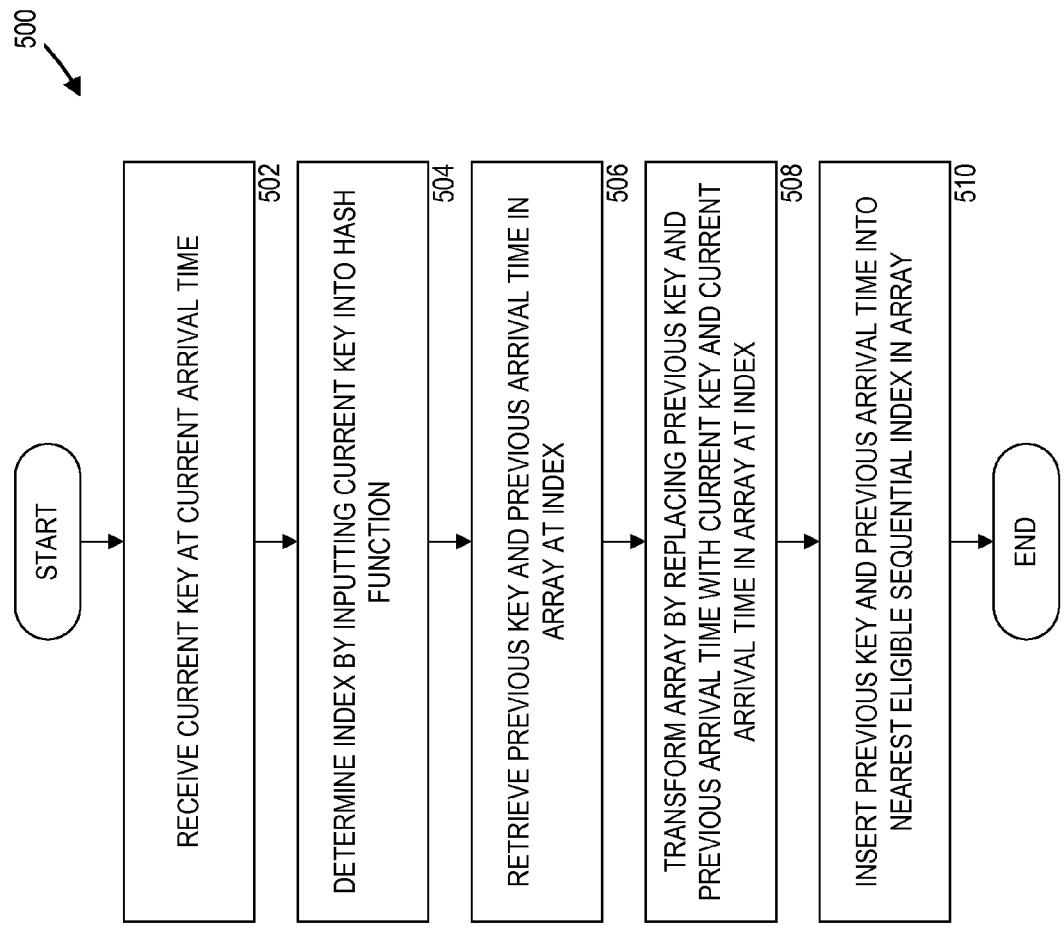

TIME-OUTS WITH TIME-REVERSED LINEAR PROBING

BACKGROUND

This application relates generally to the field of hash tables. More specifically, the disclosure provided herein relates to implementing timeouts in hash table records through time-reversed linear probing.

Storing records in a data table and retrieving the records are common tasks. Various data structures, table organizations, and access techniques have been utilized to determine a location for storing a record and to determine the location of the data table in which the record has been stored. In general, each record includes a data field and an associated key. The data field contains the relevant value to be stored and searched, and the key may be any suitable identifier associated with the value. This is sometimes referred to as a key-value pair. Various techniques for organizing the data table have been developed, including hash tables.

Hash tables employ hashing functions to store, search for, and delete records based on a key within or assigned to each record. In a common implementation for inserting data into a hash table, a hashing function receives as input the key. The hashing function then outputs a storage location where the key and value are stored. Where the data table is implemented as an array, the key maps to an index of the array, and the value is stored in the associated element of the array. Approaches for searching records in the hash table may utilize the hashing function in a similar manner.

In various applications, a user may desire that each record within the hash table expires after a given amount of time. For example, the user may want to conserve storage space. The temporary lifespan of a record may be referred to as a timeout. However, current approaches for implementing timeouts are sub-optimal. For example, one approach for implementing timeouts called tumbling windows utilizes two separate hash tables. However, maintaining and searching through two separate hash tables wastes space and consumes excessive time.

SUMMARY

Embodiments of the disclosure presented herein include methods, systems, and computer-readable media for implementing timeouts in a hash table. According to one aspect, a method for displaying data from multiple server computers is provided. According to the method, a current key is received at a current arrival time at a computer. An index in an array corresponding to the current key is determined using a hash function. A previous key and a previous arrival time are retrieved from the array at the index. The array is transformed by replacing the previous key and the previous arrival time with the current key and the current arrival time in the array at the index. The previous key and the previous arrival time are inserted into a nearest eligible sequential index in the array.

According to another aspect, a system for implementing timeouts in a hash table is provided. The system includes a memory and a processor functionally coupled to the memory. The memory stores a program containing code for implementing timeouts in a hash table. The processor is responsive to computer-executable instructions contained in the program and configured to perform the following operations. A current key is received at a current arrival time at a computer. An index in an array corresponding to the current key is determined using a hash function. A previous key and a previous arrival time are retrieved from the array at the index. The array is transformed by replacing the previous key and the previous arrival time with the current key and the current arrival time in the array at the index. The previous key and the previous arrival time are inserted into a nearest eligible sequential index in the array.

According to yet another aspect, a computer-readable medium having instructions stored thereon for execution by a processor to perform a method for implementing timeouts in a hash table is provided. According to the method, a current key is received at a current arrival time at a computer. An index in an array corresponding to the current key is determined using a hash function. A previous key and a previous arrival time are retrieved from the array at the index. The array is transformed by replacing the previous key and the previous arrival time with the current key and the current arrival time in the array at the index. The previous key and the previous arrival time are inserted into a nearest eligible sequential index in the array.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIGS. 1A, 1B, 1C, 1D, 1E are diagrams illustrating a conventional implementation of tumbling windows.

FIGS. 2A, 2B, 2C, 2D are diagrams illustrating an exemplary implementation of timeouts with regular linear probing, in accordance with some embodiments.

FIGS. 3A, 3B, 3C, 3D are diagrams illustrating an exemplary implementation of timeouts with time-reversed linear probing, in accordance with some embodiments.

FIG. 4 is exemplary C programming code configured to execute a method for implementing timeouts with time-reversed linear probing, in accordance with some embodiments.

FIG. 5 is a flow diagram illustrating an exemplary method for implementing timeouts with time-reversed linear probing, in accordance with some embodiments.

DETAILED DESCRIPTION

Figure 6:
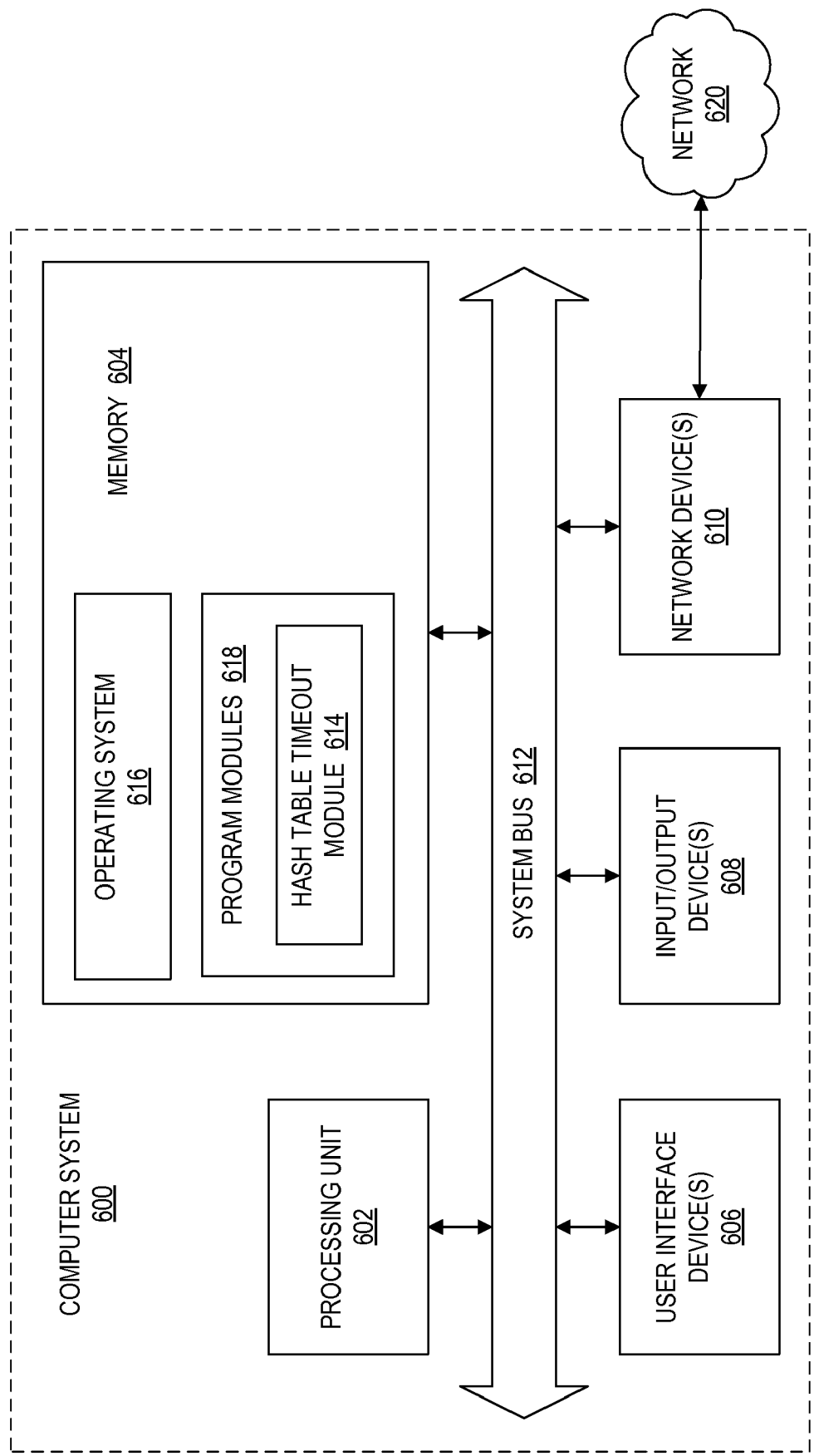
FIG. 6 is a block diagram illustrating an exemplary computer system configured to implement timeouts with time-reversed linear probing, in accordance with some embodiments.

The following detailed description is directed to methods, systems, and computer-readable media for implementing timeouts in records of a hash table through time-reversed linear probing. Through the implementation of timeouts, the hash table may temporarily store records. When a given record expires, the memory address utilized to store the given record may become empty. In this way, the memory utilized to store records is not wasted when the corresponding records are no longer needed.

Various applications may utilize the temporary records implemented through timeouts in the hash table. In one example, the temporary records may be utilized for duplicate detection. For example, traffic may be monitored at different points to discover whether the same data packet has been repeatedly sent. However, the same data packet may be retransmitted within a limited time window. In this case, the data packets may be stored in temporary records and discarded when the time window passes.

In another example, the temporary records may be utilized for packet tracing. In packet tracing, a given data packet is monitored at different points within a network. It is generally assumed that a data packet will stay in a particular network for only a temporary amount of time. As such, the data packets may be stored in temporary records and discarded when the data packet is predicted to have exited the network.

In yet another example, the timeouts in the hash table may be utilized by firewalls. A complex firewall may analyze characteristics of data packets based on a number of rules. In particular, the firewall may determine whether to allow or block the data packet based on these characteristics. However, the same data packet may be retransmitted within a limited time window. Because each analysis of a data packet can be computationally expensive, a previous analysis of a given data packet may be stored in temporary records and utilized when the same data packet arrives again. The previous analysis may then be discarded when the time window passes.

As used herein, a timeout refers to the expiration of a temporary record in a hash table. According to embodiments, a key is stored along with the key's latest arrival time in the hash table. A timeout occurs when the difference between the latest arrival time and the current time exceeds a lifespan of the key. When the timeout occurs, the key is referred to as dead; otherwise, the key is referred to as live. In one embodiment, a key associated with a time zero indicates that the associated record is empty.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, FIGS. 1A, 1B, 1C, 1D, 1E are diagrams illustrating a conventional implementation of tumbling windows for providing temporary records in a hash table. In particular, FIG. 1A shows a first window 102A and a second window 102B. Each of the windows 102A, 102B refers to a time window (i.e., a time range). For example, the first window 102A refers to a time window between time A and time B, and the second window 102B refers to a time window between time B and time C.

As illustrated in FIG. 1A, the first window 102A includes a first hash table 104A, and the second window 102B includes a second hash table 104B. Each of the windows 102A, 102B is a fixed amount of time (e.g., one second, one minute, etc.) representing a lifespan of the hash tables 104A, 104B. The first hash table 104A includes a first key 106A having a first latest arrival time 108A. The first latest arrival time 108A is between time A and time B because the first key 106A is in the first window 102A. The second hash table 104B includes a second key 106B having a second latest arrival time 108B. The second latest arrival time 108B is between time B and time C because the second key 106B is in the second window 102B. In this implementation, the arrival times 108A, 108B are values associated with the corresponding keys 106A, 106B, respectively.

In a conventional implementation of tumbling windows, two windows are active at any given time. These two windows include a previous window and a current window. The previous window and the current window represent consecutive lifespans for keys. In particular, the previous window contains keys that arrived during the immediately previous lifespan, and the current window contains keys that arrive during the current lifespan. When the current lifespan expires, the previous window is discarded because the keys that arrived in the previous lifespan are assured to be expired. Further, the current window becomes the previous window with the previous lifespan. A new current window with a new current lifespan is then created. This process may continue as each current lifespan passes.

In an illustrative example of a process for implementing tumbling windows, the first window 102A represents a previous window as indicated by a dotted line, and the second window 102B represents a current window as indicated by a solid line. That is, in a current time 108C, time B has already passed, but time C has yet to arrive. In this example, a new key 106C arrives at the current time 108C. A first determination is made as to whether the second hash table 104B in the second window 102B contains the new key 106C. In particular, if the new key 106C matches the second key 106B, then the second latest arrival time 108B is updated to be the current time 108C, and an indication that the key is live is returned. The contents of the second window 102B after updating the second latest arrival time 108B to the current time 108C is shown in FIG. 1B.

If the new key 106C does not match the second key 106B, then a second determination is made as to whether the first hash table 104A in the first window 102A contains the new key 106C. In particular, if the new key 106C matches the first key 106A, then the first key 106A is copied from the first hash table 104A into the second hash table 104B. When the first key 106A is copied into the second hash table 104B, the first key 106A is associated with the current time 108C, and an indication that the key is live is returned. The contents of the second window 102B after associating the first key 106A with the current time 108C is shown in FIG. 1C.

However, if the new key 106C does not match the first key 106A, then a conventional insertion process for inserting the new key 106C into second hash table 104B is initiated. The new key 106C is associated with the current time 108C. The contents of the second window 102B after inserting the new key 106C into the second window 102B is shown in FIG. 1D.

As illustrated in FIG. 1E, when time C eventually arrives, the first window 102A is, in effect, "discarded," and the second window 102B becomes the new previous window as indicated by a dotted line. Although the first window 102A is "discarded," the first window 102A becomes the new current window. The contents of the first window 102A may or may not be erased. If the contents of the first window 102A are not erased, a determination can be made as to whether the keys have been "discarded" by comparing the associated arrival times of the keys in the first window 102A with the current time. If the difference between the associated arrival times of the keys in the first window 102A and the current time is greater than the lifespan of the keys, then the keys may be considered as "discarded." That the first key 106A has expired and is considered "discarded" is illustrated by a strikethrough in FIG. 1E. The process as previously described may continue as each time window passes.

The tumbling windows solution as previously described suffers from several drawbacks. First, the tumbling windows solution requires two hash tables to be maintained at any given time. Second, because the tumbling windows solution utilizes two hash tables, it follows that the tumbling windows solution may require two lookups (i.e., a first lookup to the hash table in the current window and a second lookup to the hash table in the previous window) in order to determine whether a given key is live. By reducing the number of hash tables stored, the amount of memory utilized and the number of potential lookups to each hash table may be reduced.

Referring now to FIGS. 2A, 2B, 2C, an exemplary methodology for implementing, in hash tables, timeouts with regular linear probing will be described. As illustrated in FIGS. 2A, 2B, 2C, 2D, an exemplary portion of a hash table 202 is shown. In particular, the hash table 202 includes a first index 204A, a second index 204B, and a third index 204C. The first index 204A corresponds to a first entry 205A for storing a key at 206A and an associated arrival time at 208A. The second index 204B corresponds to a second entry 205B for storing a key at 206B and an associated arrival time at 208B. The third index 204C corresponds to a third entry 205C for storing a key at 206C and an associated arrival time at 208C.

The key stored at 206A, 206B, 206C may include any suitable data. In the illustrative example of FIGS. 2A, 2B, 2C, 2D, the key stored at 206A, 206B, 206C include user names. The arrival times stored at 208A, 208B, 208C include the latest arrival time of the names. A hash function, h, may be utilized to determine which of the indexes 204A, 204B, 204C corresponds to a given name.

Referring to FIG. 2A, a user Thomas arrives at time 0100. When the hash function is applied to the user Thomas, the result of the hash function is an index value 10, which corresponds to the first index 204A. The first entry 205A corresponding to the first index 204A is empty. As such, the user Thomas and Thomas's arrival time of 0100 are inserted into the first entry 205A. In particular, the user Thomas is inserted at 206A, and the arrival time of 0100 is inserted at 208A. Further, an indication that Thomas was not found in the hash table 202 is returned.

Referring to FIG. 2B, a user Jacob arrives at time 0200 (after time 0100). When the hash function is applied to the user Jacob, the result of the hash function is an index value 11, which corresponds to the second index 204B. The second entry 205B corresponding to the second index 204B is empty. As such, the user Jacob and Jacob's arrival time of 0200 are inserted into the second entry 205B. In particular, the user Jacob is inserted at 206B, and the arrival time of 0200 is inserted at 208B. Further, an indication that Jacob was not found in the hash table 202 is returned.

Referring to FIG. 2C, a user Peter arrives at time 0300 (after time 0200). When the hash function is applied to the user Peter, the result of the hash function is the index value 10, which corresponds to the first index 204A. The first entry 205A corresponding to the first index 204A is occupied. Peter is then moved to the nearest sequential index having an empty entry; this is referred to as linear probing. The second entry 205B is occupied, so the nearest sequential index having an empty entry is the third index 204C. As such, the user Peter and Peter's arrival time of 0300 are inserted into the third entry 205C corresponding to the third index 204C. In particular, the user Peter is inserted at 206C, and the arrival time of 0300 is inserted at 208C. Further, an indication that Peter was not found in the hash table 202 is returned.

When Thomas expires, the first entry 205A will be considered to be empty. However, a problem arises because Thomas has expired but Peter is live in the third entry 205C. In particular, referring to FIG. 2D, if Peter arrives again at 0400 and the first entry 205A is empty because Thomas has expired, then Peter and Peter's arrival time of 0400 will be inserted into the first entry 205A, and an indication that Peter was not found in the hash table 200 will be returned. This is incorrect because Peter is still live in the third entry 205C at the third index 204C. In order to address the above problems with regular linear probing, time-reversed linear probing is described in greater detail below.

Referring now to FIGS. 3A, 3B, 3C, 3D, 4, 5, 6, a computing system and methodology for implementing, in hash tables, timeouts with time-reversed linear probing will be described. Through the embodiments described herein, timeouts can be implemented through a single hash table. In this way, only a single lookup to the hash table is required to determine whether a given key is live or dead.

Unlike regular linear probing in which a new key is inserted at the nearest sequential index that is empty while previous keys remain in their original locations, in time-reversed linear probing, the new key is inserted at the index corresponding to the index value of the hash function. The previous key stored at the index is then moved to a nearest eligible sequential index. According to some embodiments, an index may be eligible if the key being moved (referred to herein as a "moving key") is newer than the key already stored in the index (referred to herein as a "stored key"). Thus, if the moving key is newer than the stored key, then the moving key replaces the stored key, and the stored key becomes the new moving key. The new moving key is then moved to the nearest eligible sequential index. The process as previously described may continue until no more moving keys are encountered. In particular, no more moving keys may be encountered when an empty entry has been reached or the key being replaced has expired.

As illustrated in FIGS. 3A, 3B, 3C, an exemplary portion of a hash table 302 is shown. In particular, the hash table 302 includes a first index 304A, a second index 304B, and a third index 304C. The first index 304A corresponds to a first entry 305A for storing a key at 306A and an associated arrival time at 308A. The second index 304B corresponds to a second entry 305B for storing a key at 306B and an associated arrival time at 308B. The third index 304C corresponds to a third entry 305C for storing a key at 306C and an associated arrival time at 308C.

Referring to FIG. 3A, the user Thomas arrives at time 0100. When the hash function is applied to the user Thomas, the result of the hash function is the index value 10, which corresponds to the first index 304A. The first entry 305A corresponding to the first index 304A is empty. As such, the user Thomas and Thomas's arrival time of 0100 are inserted into the first entry 305A. In particular, the user Thomas is inserted at 306A, and the arrival time of 0100 is inserted at 308A.

Referring to FIG. 3B, a user Jacob arrives at time 0200. When the hash function is applied to the user Jacob, the result of the hash function is the index value 11, which corresponds to the second index 304B. The second entry 305B corresponding to the second index 304B is empty. As such, the user Jacob and Jacob's arrival time of 0200 are inserted into the second entry 305B. In particular, the user Jacob is inserted at 306B, and the arrival time of 0200 is inserted at 308B.

Referring to FIG. 3C, a user Peter arrives at time 0300. When the hash function is applied to the user Peter, the result of the hash function is the index value 10, which corresponds to the first index 304A. The first entry 305A corresponding to the first index 304A is occupied. However, Peter's arrival time at 0300 is more recent than Thomas's arrival time at 0100. As such, Thomas and Thomas's arrival time of 0100 are removed from the first entry 305A, and Peter and Peter's arrival time of 0300 are inserted into the first entry 305A.

Thomas and Thomas's arrival time of 0100 are then moved to the nearest sequential index that is eligible. As used herein, an index may be eligible if the entry corresponding to the index is empty or is occupied by an older key. The next index after the first index 304A is the second index 304B. However, because Jacob's arrival time at 0200 is more recent than Thomas's arrival time at 0100, Jacob remains at the second index 304B. The next index after the second index 304B is the third index 304C. The third entry 305C corresponding to the third index 304C is empty. As such, the user Thomas and Thomas's arrival time of 0100 are inserted into the third entry 305C.

In another example, the third entry 305C may not be empty, but instead, may contain a new name, Bob (not shown). If Bob arrived before Thomas, then Bob is removed from the third entry 305C, and Thomas is inserted into the third entry 305C because the third index 304C is eligible. Bob is then moved the nearest sequential index that is eligible, and this process continues until no more names need to be moved. In particular, no more names need to be moved when an empty entry is encountered or if the name stored in the entry has expired. If Bob arrived after Thomas, then Thomas is not inserted in the third entry 305C because the third index 304C is not eligible. In this case, the next sequential index is checked to determine whether it is eligible, and this process continues until Thomas has been inserted and no more names need to be moved.

In yet another example, Thomas arrives again in a time frame after FIG. 3C but prior to Thomas expiring in FIG. 3D. In this case, Thomas is inserted at the first index 304A. Peter is inserted at the second index 304B because Peter's arrival time of 0300 is more recent than Jacob's arrival time of 0200. Further, Jacob is inserted into Thomas's old location at the third index 304C. In effect, a cyclical movement occurs whereby Thomas is moved from its previous location at the third index 304C into the current location at the first index 304A. The remaining keys are then iteratively moved to the next eligible index until Thomas's previous location has been filled, in the manner previously described.

By inserting and moving the names in a time-reversed order as previously described, the names that arrive at the earliest time are assured to be at an index that can be empty when the names expire. Thus, the time-reversed order eliminates the possibility that an entry is incorrectly left empty when a key expires, such as the example illustrated in FIGS. 2A, 2B, 2C, 2D. For example, referring to FIG. 3D, if Peter arrives again at 0400 after Thomas expires, then Peter remains in the first entry 305A, and Peter's previous arrival time of 0300 is updated to reflect the more recent arrival time at 0400, as indicated at 308A. Because Thomas has expired as indicated by a strikethrough, the third entry 305C is considered as empty.

In the embodiments described in FIGS. 2A, 2B, 2C, 2D and FIGS. 3A, 3B, 3C, 3D, the expiration time is fixed for each of the user names. However, in further embodiments, each data packet may define its own expiration. For example, the users Thomas, Jacob, and Peter may each define different expiration times. In this case, the hash table 200 may store the expiration times (not shown) along with the arrival times 208A, 208B, 208C, 208D, 308A, 308B, 308C, 308D.

Referring now to FIG. 4, an exemplary implementation of the previously described methodology for implementing, in hash tables, timeouts with time-reversed linear probing will be described. In particular, FIG. 4 illustrates programming code 400 written in the C programming language. The programming code 400 applies to an array A. The array A includes a plurality of indexes, such as an index i. The array A at index i, which is denoted as A[i], includes an identifier and a time. The identifier is denoted as A[i].id, and the time is denoted as A[i].time.

A first line 402 of the programming code 400 initializes the index i. A second line 404 of the programming code 400 initializes temporary variables, a and b. A third line 406 of the programming code 400 defines a time of death as the lifetime of a key x, subtracted from a current time. A fourth line 408 stores the hash value of the key x into the index i. A fifth line 410 stores the content of A[i] in the temporary variable a. The content of the temporary variable a is the previous content of A[i] that will be discarded or moved to the next sequential index that is open. The previous content may include a previous key that arrived at a previous arrival time.

A sixth line 412 stores the key x in A[i].id. A seventh line 414 stores the current time in A[i].time. Now the key x is inserted into A[i], and the previous content of A[i] is stored in the temporary variable a. An eighth line 416 is a conditional statement whereby a zero value is returned if a.time has expired. In this case, the zero value represents that the content in temporary variable a is dead. A ninth line 418 is a conditional statement whereby if a.id equals the key x, then a.time is returned. In this case, returning a.time, which is the last arrival time of the key x, is an indication that the key x is live and was previously stored in A[i].

A tenth line 420 increments the index i. An eleventh line 422 initiates a conditional "for" loop. A twelfth line 424 is a conditional statement whereby a thirteenth line 426, a fourteenth line 428, a fifteenth line 430, and a sixteenth line 432, are performed if a.time is more recent than the value in A[i]. The thirteenth line 426 stores the content of A[i] in the temporary variable b. The content of temporary variable b is the previous content of A[i] that will be discarded or moved to the next sequential index that is open. The fourteenth line 428 stores the content in temporary variable a in A[i].

The fifteenth line 430 is a conditional statement whereby a zero value is returned if b.time has expired. In this case, the zero value represents that the content in temporary variable b is dead. The sixteenth line 432 is a conditional statement whereby if b.id equals the key x, then b.time is returned. In this case, returning b.time, which is the last arrival time of the key x, is an indication that the key x is live and was previously stored in A[i]. A seventeenth line 434 increments the index i.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 5, additional details will be provided regarding the previously described methodology for providing temporary records in a hash table utilizing timeouts with time-reversed linear probing. In particular, FIG. 5 is a flow diagram illustrating an exemplary method for implementing timeouts in a hash table, such as the hash table 302. The method 500 begins at operation 502, where a current key is received at a current arrival time. In the example illustrated in FIG. 3, the current key is Peter, and the current arrival time is 0300. Upon receiving the current key at the current arrival time, the method 500 proceeds to operation 504.

At operation 504, the current key is input into a hash function. The hash function then outputs an index based on the current key. In the example illustrated in FIG. 3, when Peter is entered in the hash function, the hash function outputs the index value 10. The method 500 then proceeds to operation 506, where a previous key and a previous arrival time are retrieved from an array at the index value 10. In the example illustrated in FIG. 3, the previous key is Thomas, and the previous arrival time is 0100. In the code 400 illustrated in FIG. 4, the temporary variable a stores the previous key and the previous arrival time. Upon retrieving the previous key and the previous arrival time from the array at the index, the method 500 proceeds to operation 508.

At operation 508, the array is transformed from a previous state to a new state by replacing the previous key and the previous arrival time with the current key and the current arrival time. In the example illustrated in FIG. 3, the user Thomas is replaced with the user Peter in the array at the index value 10. The time 0100 is also replaced with the time 0400. The method 500 then proceeds to operation 510, where the previous key and the previous arrival time are inserted into the nearest eligible sequential index in the array. As previously described, an index may be eligible if the entry corresponding to the index is empty or is occupied by an older key. In the example illustrated in FIG. 3, the user Thomas is not inserted into the array at index value 11 because the arrival time of Thomas is later than the arrival time of Jacob. As such, the user Thomas is inserted into the array at index value 12 which is empty. In this example, the nearest eligible sequential index in the array is index value 12.

FIG. 6 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 6 is a block diagram illustrating a computer system 600 configured to provide temporary records in a hash table utilizing timeouts with time-reversed linear probing, in accordance with embodiments. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 616 and one or more program modules 618, according to exemplary embodiments. Examples of operating systems, such as the operating system 616, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 618 include a hash table timeout module 614. In some embodiments, the hash table timeout module 614 is embodied in computer-readable media containing instructions that, when executed by the processing unit 602, performs the method 500 for implementing timeouts in a hash table, as described in greater detail above with respect to FIG. 6. According to embodiments, the program modules 618 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 618. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via the network 620. Examples of the network devices 610 may include, but are not limited to, a modem, a radio frequency ("RF") or infrared ("IR") transceiver, a telephonic interface, a bridge, a router, or a network card. The network 620 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 620 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for implementing timeouts in a hash table, the method comprising computer-implemented operations for:
   receiving a current key at a current arrival time at a computer;
   determining an index in an array corresponding to the current key using a hash function;
   retrieving a previous key and a previous arrival time stored in the array at the index;
   transforming the array by replacing the previous key and the previous arrival time with the current key and the current arrival time in the array at the index; and
   inserting the previous key and the previous arrival time into a nearest eligible sequential index in the array, the inserting comprising
      incrementing the index to a first incremented index, wherein the array at the first incremented index contains a third key and a third arrival time,
      determining whether the previous arrival time is more recent than the third arrival time,
      in response to determining that the previous arrival time is more recent than the third arrival time, retrieving the third key and the third arrival time,
      upon retrieving the third key and the third arrival time, transforming the array by replacing the third key and the third arrival time with the previous key and previous arrival time in the array at the first incremented index, and
      inserting the third key and the third arrival time into a nearest eligible sequential index in the array.

2. The computer-implemented method of claim 1, further comprising computer-implemented operations for:
   in response to determining that the previous arrival time is not more recent than the third arrival time, incrementing the first incremented index to a second incremented index, wherein the array at the second incremented index contains a fourth key and a fourth arrival time;
   determining whether the previous arrival time is more recent than the fourth arrival time;
   in response to determining that the previous arrival time is more recent than the fourth arrival time, retrieving the third key and the third arrival time;
   upon retrieving the third key and the third arrival time, transforming the array by replacing the fourth key and the fourth arrival time with the previous key and previous arrival time in the array at the second incremented index; and
   inserting the fourth key and the fourth arrival time into a nearest eligible sequential index in the array.

3. The computer-implemented method of claim 1, further comprising computer-implemented operations for:
   determining whether the previous arrival time has expired; and
   in response to determining that the previous arrival time has expired, discarding the previous key.

4. The computer-implemented method of claim 1, further comprising computer-implemented operations for:
   determining whether the previous key is equal to the current key; and
   in response to determining that the previous key is equal to the current key, updating the previous arrival time with the current arrival time.

5. The computer-implemented method of claim 1, wherein each key in the array expires in a fixed lifetime.

6. The computer-implemented method of claim 1, wherein each key in the array expires in an individual lifetime.

7. A system for implementing timeouts in a hash table, the system comprising:
   a memory configured to store for storing a program containing code for implementing timeouts in the hash table; and
   a processor functionally coupled to the memory, the processor being responsive to computer-executable instructions contained in the program and being configured to
      receive a current key at a current arrival time,
      determine an index in an array corresponding to the current key using a hash function,
      retrieve a previous key and a previous arrival time stored in the array at the index,
      transform the array by replacing the previous key and the previous arrival time with the current key and the current arrival time in the array at the index, and
      insert the previous key and the previous arrival time into a nearest eligible sequential index in the array, wherein in being configured to insert the previous key and the previous arrival time into a nearest eligible sequential index in the array, the processor is configured to
         increment the index to a first incremented index, wherein the array at the first incremented index contains a third key and a third arrival time,
         determine whether the previous arrival time is more recent than the third arrival time,
         in response to determining that the previous arrival time is more recent than the third arrival time, retrieve the third key and the third arrival time,
         upon retrieving the third key and the third arrival time, transform the array by replacing the third key and the third arrival time with the previous key and previous arrival time in the array at the first incremented index, and
         insert the third key and the third arrival time into a nearest eligible sequential index in the array.

8. The system of claim 7, wherein the processor is further configured to:
   in response to determining that the previous arrival time is not more recent than the third arrival time, increment the first incremented index to a second incremented index, wherein the array at the second incremented index contains a fourth key and a fourth arrival time,
   determine whether the previous arrival time is more recent than the fourth arrival time,
   in response to determining that the previous arrival time is more recent than the fourth arrival time, retrieve the third key and the third arrival time,
   upon retrieving the third key and the third arrival time, transform the array by replacing the fourth key and the fourth arrival time with the previous key and previous arrival time in the array at the second incremented index, and
   insert the fourth key and the fourth arrival time into a nearest eligible sequential index in the array.

9. The system of claim 7, wherein the processor is further configured to:
   determine whether the previous arrival time has expired, and
   in response to determining that the previous arrival time has expired, discard the previous key.

10. The system of claim 7, wherein the processor is further configured to:
    determine whether the previous key is equal to the current key, and
    in response to determining that the previous key is equal to the current key, update the previous arrival time with the current arrival time.

11. The system of claim 7, wherein each key in the array expires in an individual lifetime.

12. A non-transitory computer-readable medium having instructions stored thereon for execution by a processor to perform operations for implementing timeouts in a hash table, the operations comprising:
    receiving a current key at a current arrival time;
    determining an index in an array corresponding to the current key using a hash function;
    retrieving a previous key and a previous arrival time stored in the array at the index;
    transforming the array by replacing the previous key and the previous arrival time with the current key and the current arrival time in the array at the index; and
    inserting the previous key and the previous arrival time into a nearest eligible sequential index in the array, the inserting comprising
       incrementing the index to a first incremented index, wherein the array at the first incremented index contains a third key and a third arrival time,
       determining whether the previous arrival time is more recent than the third arrival time,
       in response to determining that the previous arrival time is more recent than the third arrival time, retrieving the third key and the third arrival time,
       upon retrieving the third key and the third arrival time, transforming the array by replacing the third key and the third arrival time with the previous key and previous arrival time in the array at the first incremented index, and
       inserting the third key and the third arrival time into a nearest eligible sequential index in the array.

13. The computer-readable medium of claim 12, further comprising:
    in response to determining that the previous arrival time is not more recent than the third arrival time, incrementing the first incremented index to a second incremented index, wherein the array at the second incremented index contains a fourth key and a fourth arrival time;
    determining whether the previous arrival time is more recent than the fourth arrival time;
    in response to determining that the previous arrival time is more recent than the fourth arrival time, retrieving the third key and the third arrival time;
    upon retrieving the third key and the third arrival time, transforming the array by replacing the fourth key and the fourth arrival time with the previous key and previous arrival time in the array at the second incremented index; and
    inserting the fourth key and the fourth arrival time into a nearest eligible sequential index in the array.

14. The computer-readable medium of claim 12, further comprising:
    determining whether the previous arrival time has expired; and
    in response to determining that the previous arrival time has expired, discarding the previous key.

15. The computer-readable medium of claim 12, further comprising:
    determining whether the previous key is equal to the current key; and
    in response to determining that the previous key is equal to the current key, updating the previous arrival time with the current arrival time.

16. The computer-readable medium of claim 12, wherein each key in the array expires in a fixed lifetime.

17. The computer-readable medium of claim 12, wherein each key in the array expires in an individual lifetime.

* * * * *

UNITED STATES PATENT AND TRADEMARK OFFICE
CERTIFICATE OF CORRECTION

PATENT NO. : 8,306,958 B2
APPLICATION NO. : 12/559130
DATED : November 6, 2012
INVENTOR(S) : Mikkel Thorup It is certified that error appears in the above-identified patent and that said Letters Patent is hereby corrected as shown below:

In the Claims:

In Claim 7, Column 12, Line 33, please delete "for storing".

Signed and Sealed this
Thirtieth Day of April, 2013

Teresa Stanek Rea
*Acting Director of the United States Patent and Trademark Office*